(12) United States Patent
Ishikawa (10) Patent No.: US 6,407,768 B1
(45) Date of Patent: Jun. 18, 2002

(54) VIDEO MICROSCOPE

(76) Inventor: Seiji Ishikawa, 17-6, Kawaguti 1-chome, Kasu-shi Saitama-Pref., 3740014 (JP)

( * ) Notice: Subject to any disclaimer, the term of this patent is extended or adjusted under 35 U.S.C. 154(b) by 0 days.

(21) Appl. No.: 09/342,081

(22) Filed: Jun. 29, 1999

(51) Int. Cl.[7] .................................................. H04N 7/18
(52) U.S. Cl. ....................... 348/79; 250/201.3; 348/357
(58) Field of Search ................ 348/79, 357; 250/201.3; H04N 7/18

(56) References Cited

U.S. PATENT DOCUMENTS

| | | | | |
|---|---|---|---|---|
| 4,829,374 A | * | 5/1989 | Miyamoto et al. | 348/79 |
| 5,101,277 A | * | 3/1992 | Kanata | 348/79 |
| 5,247,165 A | * | 9/1993 | Hiruta et al. | 250/201.3 |
| 5,619,032 A | * | 4/1997 | Kasdan | 250/201.3 |
| 5,703,714 A | * | 12/1997 | Kojima | 348/79 |
| 6,215,586 B1 | * | 4/2001 | Clark | 348/79 |

FOREIGN PATENT DOCUMENTS

| | | |
|---|---|---|
| JP | 5-11180 | 2/1993 |
| JP | 2509120 | 6/1996 |

* cited by examiner

Primary Examiner—Howard Britton (74) Attorney, Agent, or Firm—Reed Smith LLP (57) ABSTRACT

A video microscope having an observation stand whose position is fixed relative to an object, a lens body tube having a lens system arranged at one end thereof along an imaging optical path with respect to the object and that is inserted into the observation stand so as to movable in the optical axis direction, a video signal converting section tube that has an image pick-up element arranged at a predetermined position that corresponds to the lens system, and movable in the optical axis direction relative to the observation stand and movable relative to the lens body tube. The video microscope further includes an object distance adjustment drive motor that moves the lens body tube in the optical axis direction by driving an object distance adjusting mechanism and an objective distance position detecting system. The objective distance adjusting mechanism adjusts the objective distance between the object and a principal point on the object side of the lens system The object distance position detecting sensor detects the objective distance. The video microscope also includes an object imaging distance adjustment drive motor that moves the video signal converting section tube in the optical axis direction, and an arithmetic controller for setting the objective distance and the object imaging distance to predetermined positions. The arithmetic controller automatically adjusts and sets the positions of the lens body tube and the video signal converting section tube so that the object is in focus on the image pick-up element at a preset magnification.

14 Claims, 9 Drawing Sheets

VIDEO MICROSCOPE

BACKGROUND OF THE INVENTION

1. Field of the Invention

The present invention relates to a video microscope, and more particularly to an improvement of a video microscope which allows a magnification for forming an image of an object to be variably and automatically set with the touch of a button in a wide range without changing the lens, etc. and which allows itself to automatically focus on the object simultaneously therewith.

2. Description of the Related Art

In a conventional video microscope of this type, it is common that the lens system itself is fixed with respect to an object; i.e., it is of a fixed focused type. Thus, in order to change an enlarging (or reducing) magnification for the formed image of the object, the lens system must be changed, and this requires that a set of lens systems corresponding to magnifying requirements should be prepared.

Further, a zoom lens system can be employed as a means for changing the enlarging (or reducing) magnification for the formed image of the object. With this system, however, the magnification can be varied only in such a relatively narrow range as, usually, within several times, and thus it is difficult to obtain a wide range of magnifications with this system.

On the other hand, Japanese Patent No. 2509120 has proposed a solution. That is, in the proposed system, the position of a lens body tube incorporating a lens system therein is adjusted by sliding the lens body tube using an objective distance adjusting mechanism, so that the objective distance of an object relative to the object side of the lens system can be adjusted. Further, the position of a video signal converting section tube having a two-dimensional CCD element is adjusted relative to the lens body tube by sliding the video signal converting section tube based on the enlarging (or reducing) magnification and using a focus adjusting mechanism. As a result of these adjustments, this system allows predetermined enlarging (or reducing) magnifications to be provided for the object in a wide range without changing the lens.

However, the proposed system involves, without fail, focus adjustment every time a predetermined enlarging (or reducing) magnification is set, and thus two-step operations are required. In addition, if the object is largely out of focus, it is difficult to find a direction for the adjustment, and thus these operations entail a lot of time and labor.

SUMMARY OF THE INVENTION

The present invention has been made to overcome these conventional problems. An object of the invention is, therefore, to provide a video microscope of this type which allows a magnification for forming an image of an object to be variably and automatically set in a wide range with the touch of a button while driving motors without changing the lens, etc. and which also allows itself to automatically focus on the object simultaneously therewith by driving the motors.

To achieve the above object, according to one aspect of the present invention, there is provided a video microscope, which comprises: an observation stand whose position is fixed relative to an object; a lens body tube having a lens system arranged at one end thereof along an imaging optical path with respect to the object and being inserted into the observation stand so as to be movable in the optical axis direction; a video signal converting section tube having an image pickup element arranged at a predetermined position corresponding to the lens system, being arranged so as to be movable in the optical axis direction relative to the observation stand, and being arranged so as to be movable relative to the lens body tube; an objective distance adjustment drive motor for moving the lens body tube in the optical axis direction by driving an objective distance adjusting mechanism and an objective distance position detecting sensor which are arranged between the observation stand and the lens body tube, the objective distance adjusting mechanism serving to adjust an objective distance between the object and a principal point on the object side of the lens system, the objective distance position detecting sensor serving to detect the objective distance; an object imaging distance adjustment drive motor for moving the video signal converting section tube in the optical axis direction by driving an object imaging distance adjusting mechanism and an object imaging distance position detecting sensor which are provided between the observation stand and the video signal converting section tube, the object imaging distance adjusting mechanism serving to adjust an object imaging distance between the object and the image pickup surface of the image pickup element, the object imaging distance position detecting sensor serving to detect the object imaging distance; and an arithmetic controller for setting the objective distance and the object imaging distance to predetermined positions by driving the objective distance adjustment drive motor and the object imaging distance adjustment drive motor. In such a video microscope, in response to a position detection signal from the objective distance position detecting sensor and a position detection signal from the object imaging distance position detecting sensor, the arithmetic controller can automatically adjust and set the positions of the lens body tube and the video signal converting section tube by respectively driving the objective distance adjustment drive motor and the object imaging distance adjustment drive motor in such a manner that the object can be in focus on the image pickup element at a set magnification.

According to another aspect of the present invention, in addition to the aforementioned video microscope, the image pickup element is constructed of a two-dimensional CCD element and an illuminating light for illuminating the object is provided at the distal end of one of the lens body tube and the observation stand.

Further, according to still another aspect of the present invention, in addition to the aforementioned video microscope, a video magnification setting unit that sets a magnification for magnifying an image obtained by the image pickup element is provided, and the arithmetic controller drives both motors so that the objective distance and the object imaging distance are adjusted to such predetermined positions as to correspond to a video magnification based on a video magnification setting signal from the video magnification setting unit.

Further, according to still another aspect of the present invention, in addition to the aforementioned video microscopes, both motors are longitudinally arranged in such a manner that output shafts thereof project in the optical axis direction. As a result of this arrangement, both motors are compactly accommodated in the observation stand and thus the whole video microscope can be made compact.

Further, according to still another aspect of the present invention, in addition to the aforementioned video microscopes, the set magnification can be changed to a desired magnification with the object being in focus on the image pickup element by moving the lens body tube and the video signal converting section tube in such a manner that the objective distance value and the object imaging distance value always correspond to any magnifications obtained in the course of changing the set magnification to the desired magnification. As a result of this arrangement, the object is kept in focus at all times while the magnification is being changed, and thus the user can have an improved visibility, e.g., when the user wishes to enlarge a specific portion of the object.

Further, according to still another aspect of the present invention, in addition to the aforementioned video microscopes, the observation stand, each of the lens body tube and the video signal converting section tube is formed into a tube having a rectangular cross section, and the objective distance adjustment drive motor and the object imaging distance adjustment drive motor are arranged both between the observation stand and the lens body tube and on one side surface or between two side surfaces. As a result of this arrangement, the space within the observation stand can be utilized effectively, and thus the video microscope can be made compact.

Further, according to still another aspect of the present invention, in addition to the aforementioned video microscopes, both motors are arranged on the back surface of the observation stand. As a result of this arrangement, the width in the horizontal direction of the video microscope can be made narrow. Still further, according to still another aspect of the present invention, in addition to the aforementioned video microscopes, both motors are vertically overlapped one upon another in the optical axis direction. As a result of this arrangement, the space can be utilized effectively, and thus the whole video microscope can be downsized.

Further, according to still another aspect of the present invention, there is provided a video microscope, in which an objective distance between an object and a principal point on the object side of a lens system can be adjusted by a motor for driving both a mechanism and a position sensor for detecting the position of the mechanism integrally, the mechanism serving to adjust a lens body tube relative to an observation stand in such a manner that the lens body tube internally slides along the observation stand, the lens body tube incorporating the lens system therein and having an illuminating light for illuminating the object arranged therein, the observation stand confronting the object, and in which an object imaging distance between the object and a two-dimensional CCD element can be adjusted by a motor for driving a mechanism and a position sensor for detecting the position of the mechanism integrally, the mechanism serving to adjust a video signal converting section tube relative to the observation stand so that the video signal converting section tube internally slides along the observation stand, the video signal converting section tube having the two-dimensional CCD sensor internally sliding along the lens body tube. In such a video microscope, by using a video magnification setting unit and an arithmetic controller which are prepared separately from the video microscope, the objective distance and the object imaging distance corresponding to a video magnification set when the object has been in focus are automatically adjusted and set to an objective distance (a) and an object imaging distance (L) corresponding to the set video magnification by calculating and controlling an objective distance adjustment drive motor and an object imaging distance adjustment drive motor so that the lens body tube and the video signal converting section tube are moved to such positions as to always satisfy predetermined relational expressions.

The aforementioned predetermined expressions are the following expressions (1) to (3).

$$1/a + 1/b = 1/f \quad (1)$$

(basic formula)

$$a = f + f/m \quad (2)$$

$$L = f(2 + 1/m + m) + t \quad (3)$$

f: Focal length of the lens system a: Objective distance (distance from the object to the principal point on the object side of the lens system)

b: Imaging distance (distance from the principal point on the imaging side of the lens system to the two-dimensional CCD surface)

m=b/a: Imaging magnification of the lens system (dimension of the formed image/dimension of the object)

L=a+b+t: Object imaging distance (distance from the object to the two-dimensional CCD surface)

t: Lens thickness (distance from the principal point on the object side to the principal point on the imaging side of the lens system)

That is, the video microscope is constructed so that the expressions (2) and (3) are derived from the basic formula for a convex lens: 1/a+1/b=1/f, and the objective distance adjustment drive motor and the object imaging distance adjustment drive motor are controlled to be driven by the arithmetic controller in such a manner that the objective distance and the object imaging distance are automatically adjusted and set to the objective distance (a) and the object imaging distance (L) corresponding to the set imaging magnification.

Therefore, according to the aforementioned aspects of the present invention, the objective distance is controlled by the objective distance adjustment drive motor, and the object imaging distance is controlled by the object imaging distance adjustment drive motor, and such controls are effected by the arithmetic controller, which controls the motors based on its calculation made in response to a predetermined magnification setting signal as well as position detection signals from the objective distance position detecting sensor and the object imaging distance position detecting sensor. That is, the arithmetic controller automatically adjusts and sets the respective motors so that the lens body tube and the video signal converting section tube are moved to such positions as to set a predetermined magnification and allow the object to be in focus at the same time. As a result, a clear image of the object can be formed while projected on the image pickup element at an arbitrarily set enlarging (or reducing) magnification. Thus, the video microscope according to the present invention does not require lens systems to be changed nor does it involve laborious focusing and related operations when the magnification is varied manually.

Further, according to still another aspect of the present invention, in addition to the aforementioned video microscopes, both motors are longitudinally arranged in such a manner that output shafts thereof project in the optical axis direction. As a result of this arrangement, both motors are compactly accommodated in the observation stand, and thus the whole video microscope can be made compact.

Further, according to still another aspect of the present invention, in addition to the aforementioned video microscopes, the set magnification can be changed to a desired magnification with the object being in focus on the image pickup element by moving the lens body tube and the video signal converting section tube in such a manner that the objective distance value and the object imaging distance value always correspond to any intermediate magnifications obtained in the course of changing the set magnification to the desired magnification. As a result of this arrangement, the object is kept in focus at all times while the magnification is being changed, and thus the user can have an improved visibility, e.g., when the user wishes to enlarge a specific portion of the object.

Further, according to still another aspect of the present invention, in addition to the aforementioned video microscopes, the observation stand, each of the lens body tube and the video signal converting section tube is formed into a tube having a rectangular cross section, and the objective distance adjustment drive motor and the object imaging distance adjustment drive motor are arranged both between the observation stand and the lens body tube and on one side surface or between two side surfaces. As a result of this arrangement, the space within the observation stand can be utilized effectively, and thus the video microscope can be made compact.

Further, according to still another aspect of the present invention, in addition to the aforementioned video microscopes, both motors are arranged on the back surface of the observation stand. As a result of this arrangement, the width in the horizontal direction of the video microscope can be made narrow. Still further, according to still another aspect of the present invention, in addition to the aforementioned video microscopes, both motors are vertically overlapped one upon another in the optical axis direction. As a result of this arrangement, the space can be utilized effectively, and thus the whole video microscope can be downsized.

BRIEF DESCRIPTION OF THE DRAWINGS

In the accompanying drawings:

FIG. 9 is a partially sectional view of the video microscope when FIG. 7 is viewed in the direction indicated by an arrow IX.

DETAILED DESCRIPTION OF THE PREFERRED EMBODIMENTS

A video microscope according to a first embodiment of the present invention will now be described in detail with reference to FIGS. 1 to 5.

Figure 1:
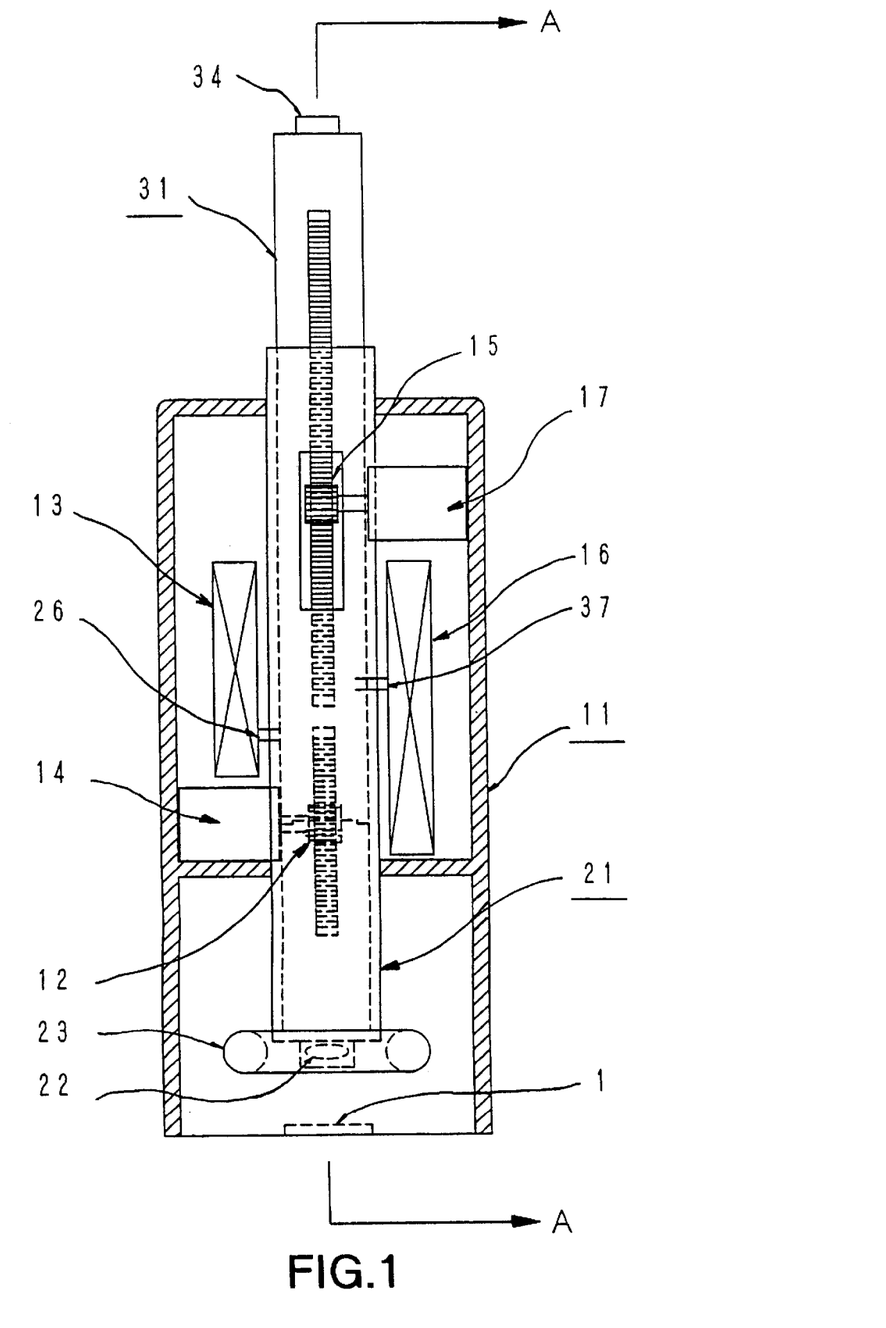
FIG. 1 is a partially sectional front view of a video microscope according to a first embodiment of the present invention.
Figure 2:
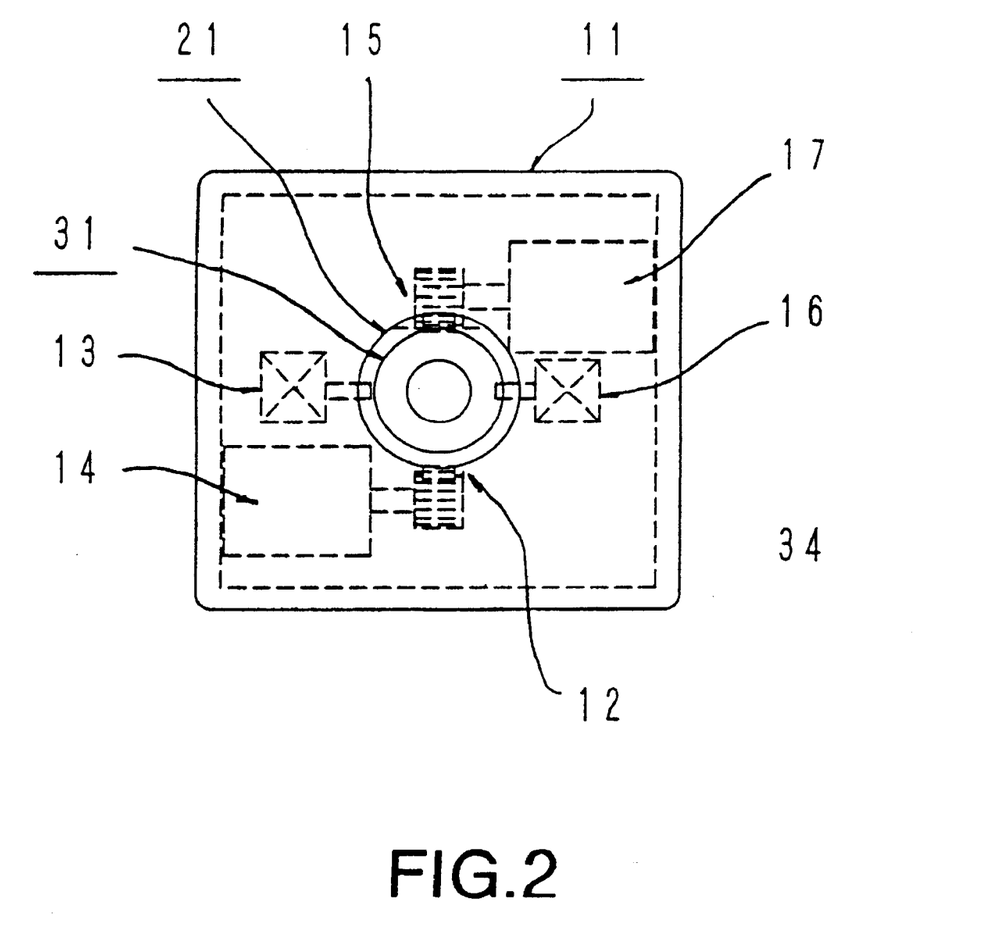
FIG. 2 is a perspective plan view showing an interior of the video microscope shown in FIG.1.
Figure 3:
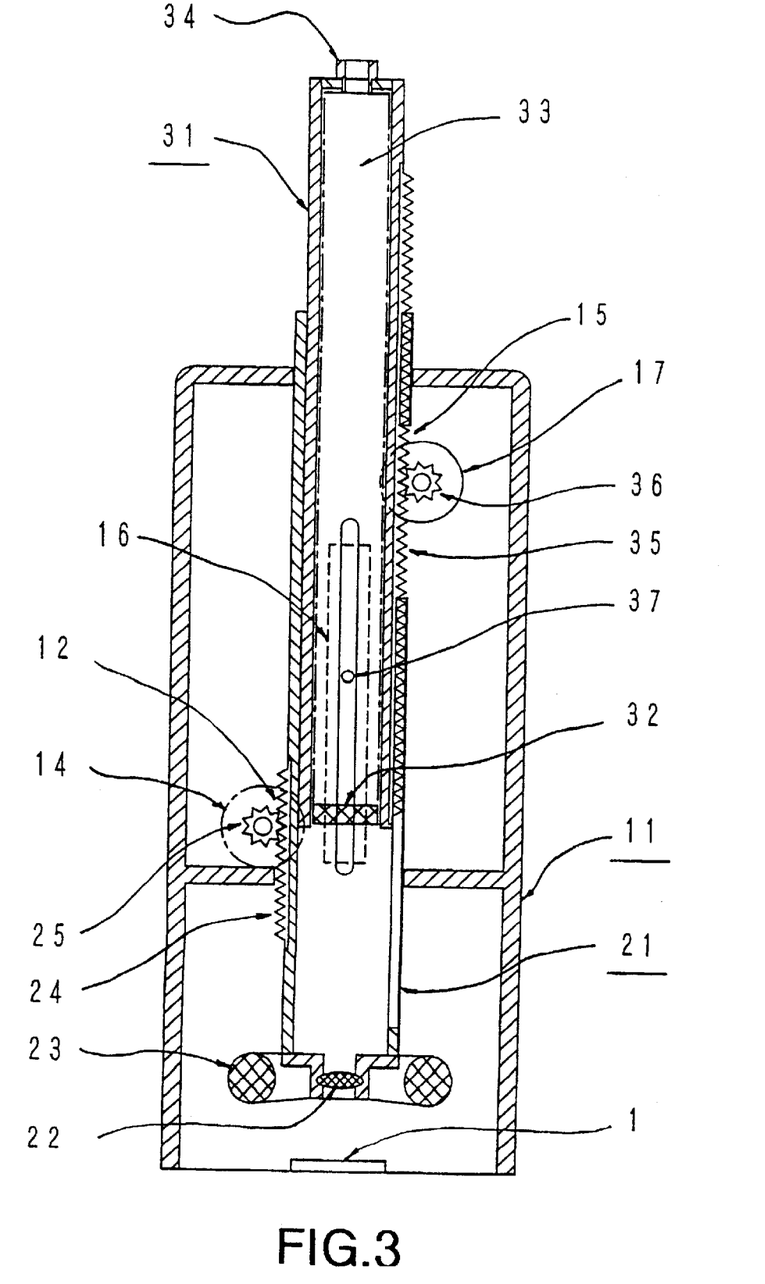
FIG. 3 is a sectional view taken along the line A—A of FIG. 1.

FIGS. 1 and 2 are a front view and a plan view showing the appearance and the internal mechanical arrangement of a video microscope according to the first embodiment of the present invention, and FIG. 3 is a longitudinal side view showing the internal mechanisms of the video microscope taken along the line A—A of FIG. 1.

In FIGS. 1 to 3, reference numeral 11 denotes an observation stand having a tubelike shape whose cross section is rectangular and fixed for observing an enlarged (or reduced) image of an object 1; reference numeral 21 denotes a cylindrical lens body tube that has a lens system, i.e., a convex lens 22 acting as an objective lens in this embodiment, at one end thereof along an axially extending imaging optical path; and reference numeral 31 denotes a cylindrical video signal converting section tube that has a two-dimensional CCD element 32 at a predetermined position which is inside one opened end of the tube 21 and which is on the imaging optical path corresponding to the convex lens 22, and incorporates an assembly 33 such as the drive circuit of the two-dimensional CCD element 32 and the like, and also has at the other end thereof a cable connector 34 for inputting signals for driving and controlling the assembly 33 such as the drive circuit and for outputting video signals and the like to be processed by the assembly 33 such as the drive circuit. While the observation stand 11 has a rectangular cross section and the lens body tube 21 and the video signal converting section tube 31 have a circular cross section in this embodiment, all the three members may be configured to have a rectangular or circular cross section; i.e., the external shape of these members is not limited to the aforementioned examples, respectively.

More specifically, the observation stand 11 is formed into a tubelike body whose opening at one end is large enough to receive the object 1, allows the lens body tube 21 to be inserted thereinto from the opening at the other end in such a manner that the lens body tube 21 is slidable in the axial direction while internally touching the stand 11 relatively intimately. Also, a ringlike illuminating light 23 for illuminating the object 1 is fixed around the distal end of the lens body tube 21. Between the observation stand 11 and the lens body tube 21 are provided an objective distance adjusting mechanism 12, an objective distance position detecting sensor 13 and an objective distance adjustment drive motor 14. The mechanism 12 adjusts the objective distance of the object 1 to be received in the opening at one end relative to the convex lens 22. The sensor 13 detects the objective distance. The motor 14 drives the mechanism 12 and the sensor 13.

Note that the illuminating light 23 is not necessarily shaped like a ring, nor is it constructed of a lamp or the like as long as it can illuminate the object 1 effectively. For example, light may be introduced from an external light source via an optical fiber or the like. Further, while the illuminating light 23 can be fixed to the observation stand 11, it is more effective when the light 23 is fixed to the lens body tube 21 in that the brightness of the object corresponding to the magnification can be obtained. Note also that the illuminating light 23 may be dispensed with if the object is illuminated sufficiently to form its image without the light 23.

Here, the objective distance adjusting mechanism 12 is constructed as follows. For example, a pinion 25 for a rack 24 attached to the side surface of the lens body tube 21 is rotated by the objective distance adjustment drive motor 14, so that the lens body tube 21 is moved relative to the observation stand 11 in the same direction as the direction of the optical axis, i.e., vertically as viewed in FIG. 1. Further, the objective distance adjustment drive motor 14 may preferably be a dc reversely rotatable motor with a built-in reducing mechanism.

Here also, the video signal converting section tube 31 is inserted into the lens body tube 21 from the opening at the other end of the lens body tube 21 in such a manner that the video signal converting section tube 31 is slidable in the axial direction while internally touching the tube 21 relatively intimately. Between the observation stand 11 and the video signal converting section tube 31 are provoed an object imaging distance adjusting mechanism 15, an object imaging distance position detecting sensor 16 and an object imaging distance adjustment drive motor 17. The mechanism 15 adjusts the object imaging distance of the object 1 relative to the image pickup surface of the two-dimensional CCD element 32. The sensor 16 detects the object imaging distance. The motor 17 drives the mechanism 15 and the sensor 16.

Here, the object imaging distance adjusting mechanism 15 is constructed as follows. For example, a rack 35 attached to the side surface of the video signal converting section tube 31 meshes with a pinion 36 in such a manner that the rack 35 is stuck out of a slitlike window formed in the corresponding side surface of the lens body tube 21 and that the tube 31 is inserted into the tube 21 so as to be slidable in the axial direction, and by rotating the pinion with the object imaging distance adjustment drive motor 17, the video signal converting section tube 31 is moved relative to the observation stand 11 in the same direction as the direction of the optical axis, i.e., vertically as viewed in FIG. 1 while sliding along the lens body tube 21. Further, here also, the object imaging distance adjustment drive motor 17 may preferably a dc reversely rotatable motor with a built-in reducing mechanism.

Note that the objective distance adjusting mechanism 12 and the object imaging distance adjusting mechanism 15 may use any mechanical method as long as they can move the lens body tube 21 and the video signal converting section tube 31 in the vertical direction independently of each other by rotating the objective distance adjustment drive motor 14 and the object imaging distance adjustment drive motor 17, respectively. For example, a mechanism using the rotation of a helicoid tube is acceptable, and a bevel gear, a worm gear or the like may also be interposed between the motor and the pinion, if necessary.

Further, the objective distance position detecting sensor 13 and the object imaging distance position detecting sensor 16 are constructed of, e.g., sliding variable resistors, with sliding knobs 26 and 37 thereof connected to the lens body tube 21 and the video signal converting section tube 31, respectively. As a result, the sensors 13 and 16 can obtain an output of resistance changes corresponding to the vertical movements of the tubes 21 and 31, respectively.

Figure 4:
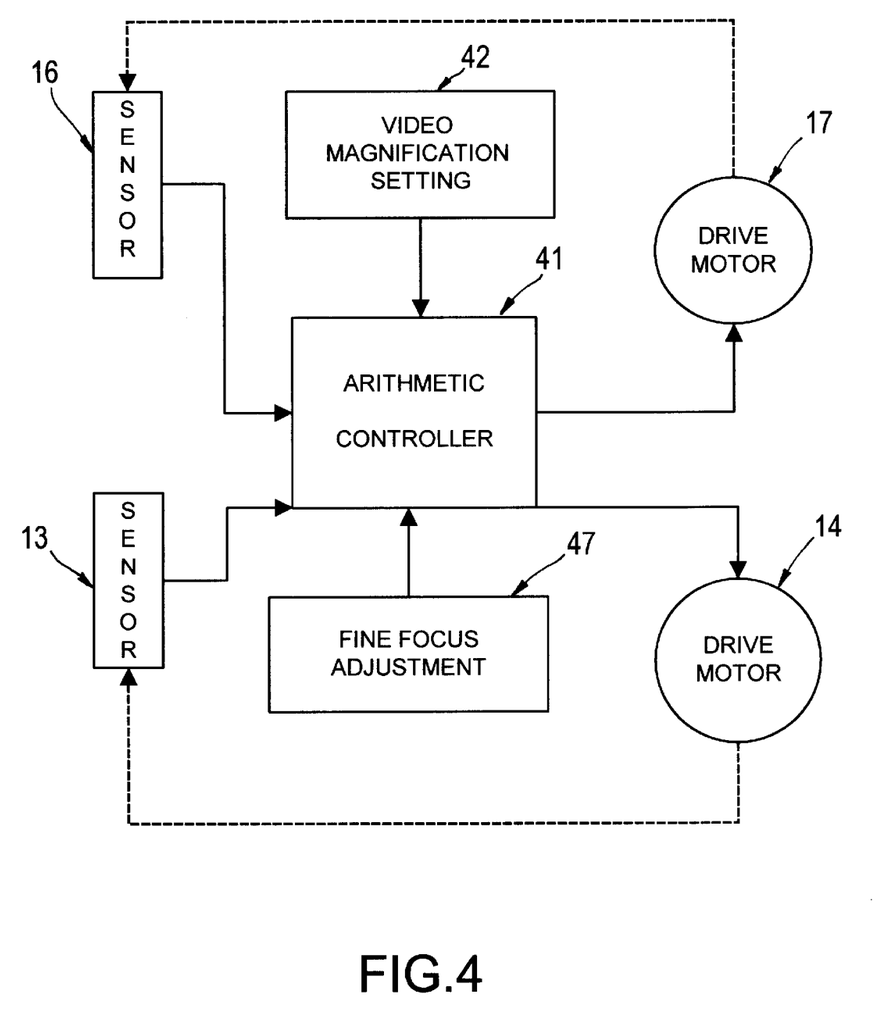
FIG. 4 is a block diagram showing a circuit configuration around a motor arithmetic controller of the video microscope according to the first embodiment.
Figure 5:
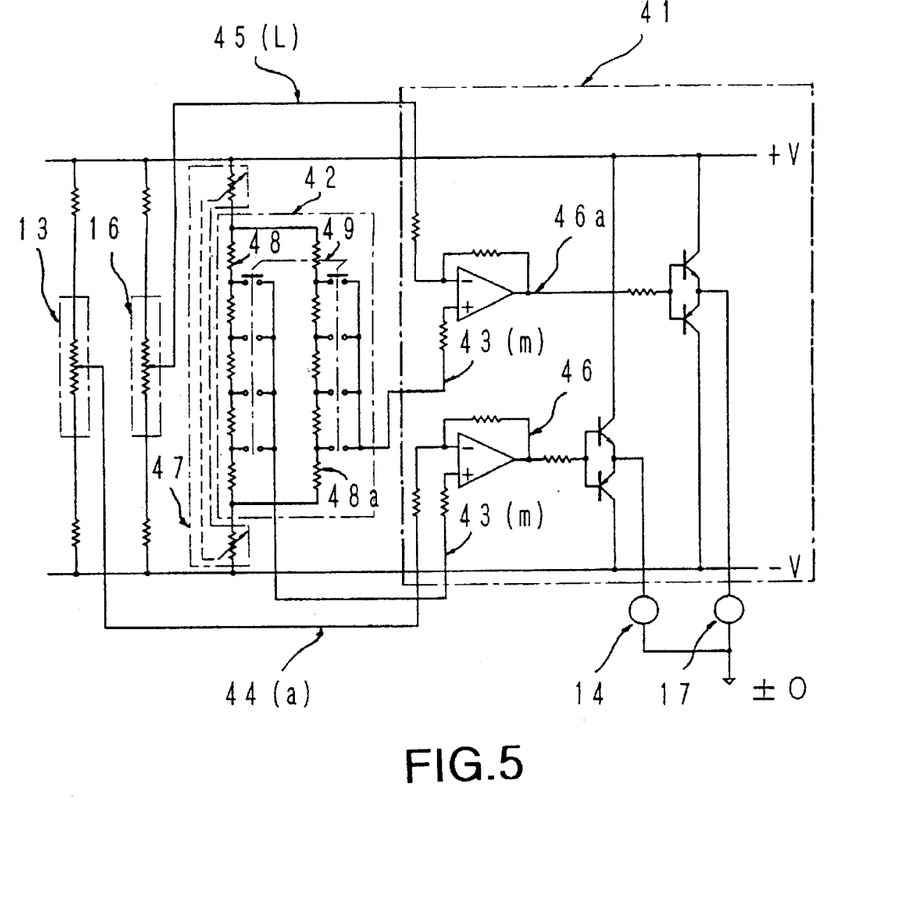
FIG. 5 is a circuit diagram showing an example of a specific circuit configuration of FIG. 4.

FIG. 4 shows a series of configurations in which an arithmetic controller 41 effects control to drive the objective distance adjustment drive motor 14 and the object imaging distance adjustment drive motor 17 in the video microscope according to this embodiment, and FIG. 5 shows a specific example of the circuit configuration.

In FIG. 4, reference numeral 42 denotes a video magnification setting unit for outputting a video magnification setting signal 43 (m) to the arithmetic controller 41. Also an objective distance position detection signal 44 (a) from the objective distance position detecting sensor 13 and an object imaging distance position detection signal 45 (L) from an object imaging distance position detecting sensor 16 are inputted to the arithmetic controller 41, and the controller 41 serves to set values so as to effect control to drive the objective distance adjustment drive motor 14 and the object imaging distance adjustment drive motor 17 in such a manner that the motors 14 and 17 always satisfy the following relational expressions (2) and (3) derived from the following expression (1), which is a lens formula. Further, reference numeral 47 denotes a fine focus adjusting unit. The aforementioned expressions are as follows.

$$1/a + 1/b = 1/f \quad (1)$$

(basic formula)

$$a = f + f/m \quad (2)$$

$$L = f(2 + 1/m + m) + t \quad (3)$$

f: Focal length of the lens system a: Objective distance (distance from the object to the principal point on the object side of the lens system)

b: Imaging distance (distance from the principal point on the imaging side of the lens system to the two-dimensional CCD surface)

m=b/a: Imaging magnification of the lens system (dimension of the formed image/dimension of the object)

L=a+b+t: Object imaging distance (distance from the object to the two-dimensional CCD surface)

t: Lens thickness (distance from the principal point on the object side to the principal point on the imaging side of the lens system)

FIG. 5 shows an exemplary circuit design in which sliding variable resistors are used as the objective distance position detecting sensor 13 and the object imaging distance position detecting sensor 16. Reference numerals 46 and 46a denote voltage signals for effecting control to drive the objective distance adjustment drive motor 14 and the object imaging distance adjustment drive motor 17, respectively. The "+" or "−" signs indicate the forward or backward rotation of each motor. When control is effected so that the motors 14 and 17 satisfy the relational expressions (2) and (3), and then the voltage signals become zero in response thereto, thereby causing the motors to stop independently of each other.

Further, the fine focus adjusting unit 47 is a tandem type variable resistor, and thus its circuit is designed so that the magnification does not fluctuate when the focus has been finely adjusted. Further, a multi-circuit, multi-contact switching unit 49 is used in the video magnification setting unit 42, and the circuit of the unit 42 is designed to set voltage setting circuits 48 and 48a in such a manner that the objective distance position detecting signal 44 (a) and the object imaging distance position detecting signal 45 (L) take values corresponding to the set magnification, respectively. Still further, the voltage signals from the circuits 48 and 48a are used also as magnification indication setting signals for a superimposed screen for displaying an enlarged (reduced) image by using an auxiliary circuit of a selector switch.

While an example of an analog servo control is shown in FIG. 5, a digital arithmetic control method may also be adopted to similarly control the objective distance adjustment drive motor 14 and the object imaging distance adjustment drive motor 17. The digital arithmetic control method uses, e.g., digital position detecting sensors such as rotary digital encoders or magnescales as the objective distance position detecting sensor 13 and the object imaging distance position detecting sensor 16, uses a digital switch having a required number of digits as the magnification setting unit, and uses a microcomputer or a personal computer as the arithmetic controller. Further, in this case, pulse motors may also be used as the objective distance adjustment drive motor 14 and the object imaging distance adjustment drive motor 17.

Therefore, in the construction of the video microscope according to the first embodiment as described above, by only setting the video magnification setting unit 42 to a desired magnification with the touch of a button, the lens body tube 21 and the video signal converting section tube 31 are automatically set to the predetermined magnification and corresponding focusing position quickly and independently of each other simultaneously by their driving motors, and thus a clear image can be obtained. Further, if the circuits configurations shown in FIG. 5 are incorporated in the main body of the mechanical section shown in FIGS. 1 to 3 in all or in part (e.g., only the video magnification setting unit 42 and the fine focus adjusting unit 47), the operability of the video microscope can be further improved.

Next, a video microscope according to a second embodiment of the present invention will be described in detail with reference to FIG. 6. Note that in the second embodiment, a detailed description of parts and components similar to those of the first embodiment will be omitted and such parts and components are denoted by the reference numerals used in the first embodiment.

Figure 6:
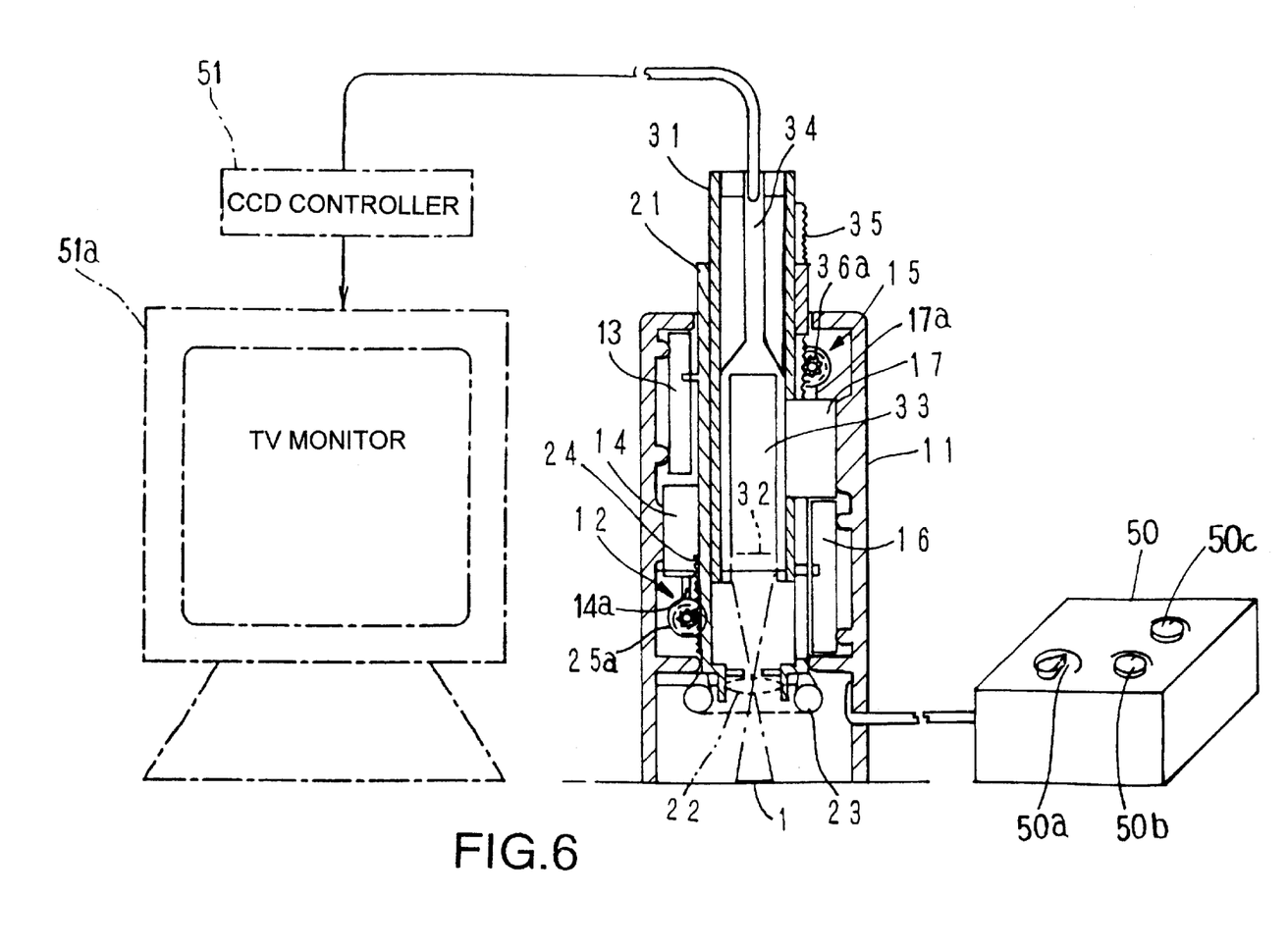
FIG. 6 is a partially sectional front view of a video microscope according to a second embodiment of the present invention.

As shown in FIG. 6, the video microscope according to the second embodiment of the present invention has, similarly to the above described first embodiment, the observation stand 11 for observing an enlarged (or reduced) image of the object 1, the lens body tube 21 having the convex lens 22 that acts as an objective lens arranged along an axially extending imaging optical path, and the video signal converting section tube 31 having the two-dimensional CCD element 32 arranged at a predetermined position on the imaging optical path corresponding to the convex lens 22. The video signal converting section tube 31 incorporates the assembly 33 such as a drive circuit of the two-dimensional CCD element 32 and the like, and also has the cable connector 34 for inputting signals for driving and controlling the assembly 33 such as the drive circuit and for outputting video signals and the like to be processed by the assembly 33 such as the drive circuit. Note that in this embodiment also, the observation stand 11, the lens body tube 21 and the video signal converting section tube 31 may be rectangular or circular in their cross sections, similarly to the above described first embodiment.

The observation stand 11 is formed into a rectangular tubelike body whose opening at one end is large enough to receive the object 1, allows the lens body tube 21 to be inserted thereinto from the opening at the other end in such a manner that the lens body tube 21 is slidable in the axial direction while internally touching the stand 11 relatively intimately. Also a ringlike shaped illuminating light 23 for illuminating the object 1 is fixed around the distal end of the lens body tube 21. Between the observation stand 11 and the lens body tube 21 are provided an objective distance adjusting mechanism 12, an objective distance position detecting sensor 13 and an objective distance adjustment drive motor 14. The mechanism 12 adjusts the objective distance of the object 1 to be received in the opening at one end relative to the convex lens 22. The sensor 13 detects the objective distance. The motor 14 drives the mechanism 12 and the sensor 13.

The video signal converting section tube 31 is inserted into the lens body tube 21 from the opening at the other end of the tube 21 in such a manner that the tube 31 is slidable in the axial direction while internally touching the tube 21 relatively intimately. Between the observation stand 11 and the video signal converting section tube 31 are provided an object imaging distance adjusting mechanism 15, an object imaging distance position detecting sensor 16 and an object imaging distance adjustment drive motor 17. The mechanism 15 positionally adjusts the object imaging distance of the object 1 relative to the image pickup surface of the two-dimensional CCD element 32. The sensor 16 detects the object imaging distance. The motor 17 drives the mechanism 15 and the sensor 16.

The objective distance adjusting mechanism 12 is constructed as follows. A pinion-attached bevel gear 25a for the rack 24 attached to a side surface of the lens body tube 21 is rotated by the objective distance adjustment drive motor 14, so that the lens body tube 21 is moved relative to the observation stand 11 in the same direction as the direction of the optical axis, i.e., vertically as viewed in FIG. 6. Note that, unlike the first embodiment, the objective distance adjustment drive motor 14 in this embodiment is arranged longitudinally so that an output shaft 14a thereof projects in the same direction as the direction of the optical axis. As a result of this arrangement, the whole video microscope in the directions of thickness thereof (the directions extending from left to right and from front to back as viewed in FIG. 6) can be made compact.

The object imaging distance adjusting mechanism 15 is constructed as follows. A rack 35 attached to a side surface of the video signal converting section tube 31 meshes with a pinion-attached bevel gear 36a in such a manner that the rack 35 is stuck out of a slitlike window formed in the corresponding side surface of the lens body tube 21 and the tube 31 is inserted into the tube 21 so as to be slidable in the axial direction, and by rotating the gear 36a with the object imaging distance adjustment drive motor 17, the video signal converting section tube 31 is moved relative to the observation stand 11 in the same direction as the direction of the optical axis, i.e., vertically as viewed in FIG. 6 while sliding along the lens body tube 21. Note that, unlike the first embodiment, the object imaging distance adjustment drive motor 17 in this embodiment is arranged longitudinally so that an output shaft 17a thereof projects in the same direction as the direction of the optical axis similarly to the objective distance adjustment drive motor 14. As a result of this arrangement, the whole video microscope in the directions of thickness thereof (the directions extending from left to right and from front to back as viewed in FIG. 6) can be made further compact.

Further, in this embodiment, a scope controller 50 having both functions of the video magnification setting unit 42 and the fine focus adjusting unit 47 in the first embodiment is provided outside the observation stand 11, and the scope controller 50 is configured to send signals for magnification setting and fine focus adjusting, respectively, to the objective distance adjustment drive motor 14 and the object imaging distance adjustment drive motor 17 from outside the video microscope. As a result of this construction, the operability of the video microscope can be improved by increasing the size of its operation section and, at the same time, the main body can be made compact. Note that the scope controller 50 has two magnification setting knobs 50a and 50b and one fine focus adjusting knob 50c on its upper surface.

Still further, in this embodiment, the video microscope allows the user to see a more visible image by connecting thereto a CCD controller 51 and a large-sized TV monitor 51a through the cable connector 34 and displaying the image of the object 1 formed by the two-dimensional CCD element 32 on the large-sized TV monitor 51*a* in an enlarged form.

Note that how the motors 14 and 17 are controlled and how their circuits are specifically designed are totally arbitrary as long as such a motor drive control as to satisfy the expressions (1) to (3) can be effected.

Next, a video microscope according to a third embodiment of the present invention will be described in detail with reference to FIGS. 7 to 9. Note that in the third embodiment, a detailed description of parts and components similar to those of the first and second embodiments will be omitted and such parts and components are denoted by the reference numerals used in the first and second embodiments.

Figure 7:
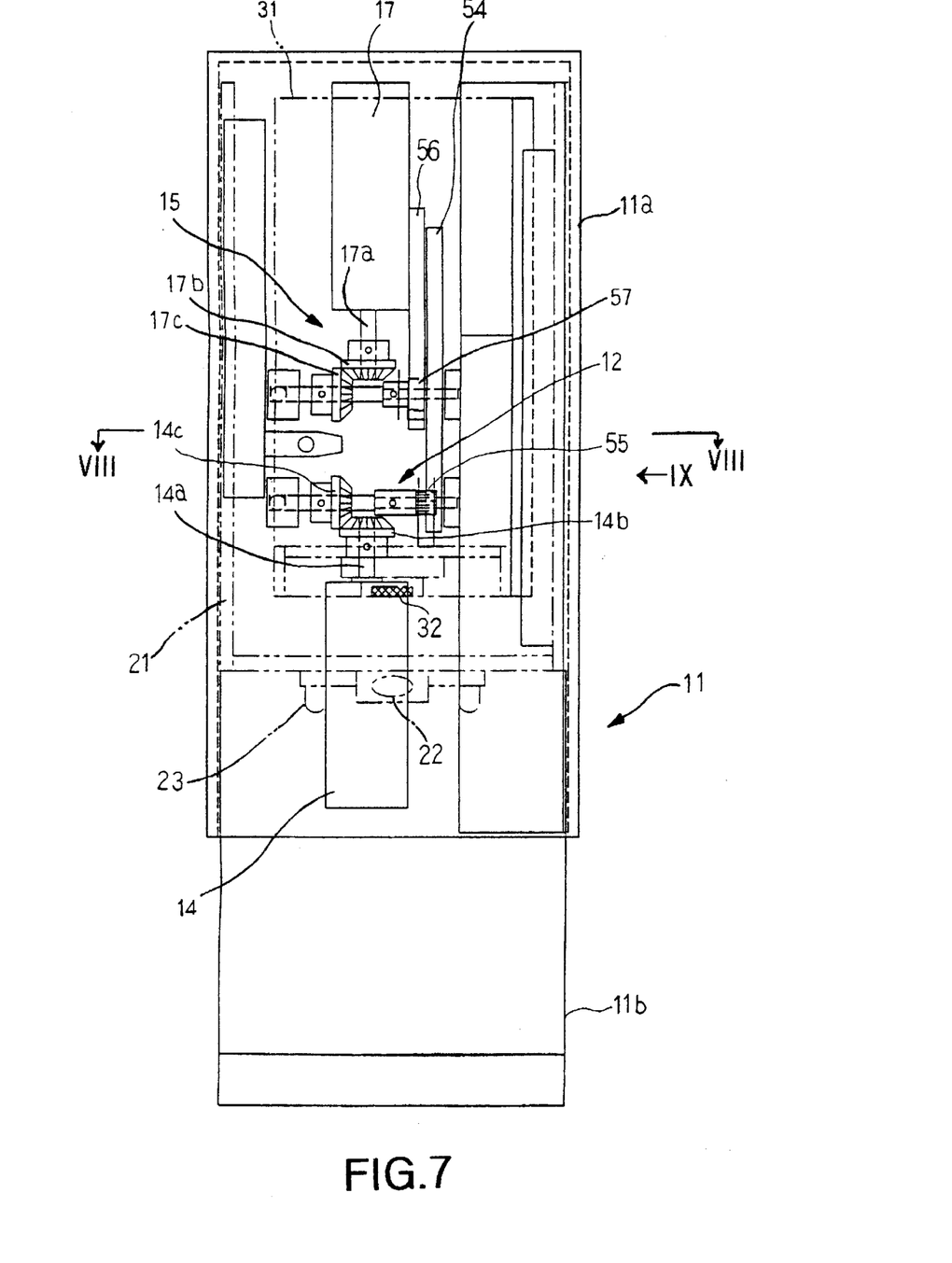
FIG. 7 is a perspective front view showing an interior of a video microscope according to a third embodiment of the present invention.
Figure 8:
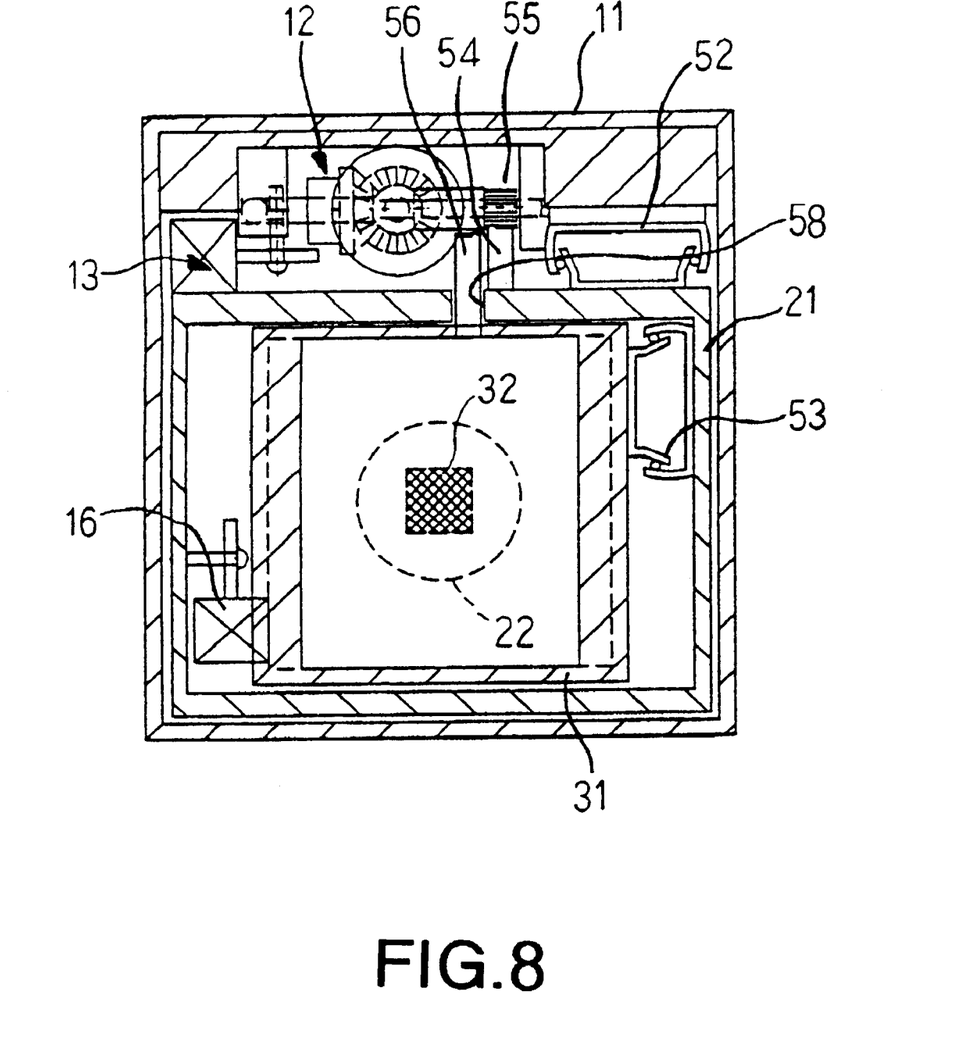
FIG. 8 is a sectional view taken along the line VIII—VIII of FIG. 7.
Figure 9:
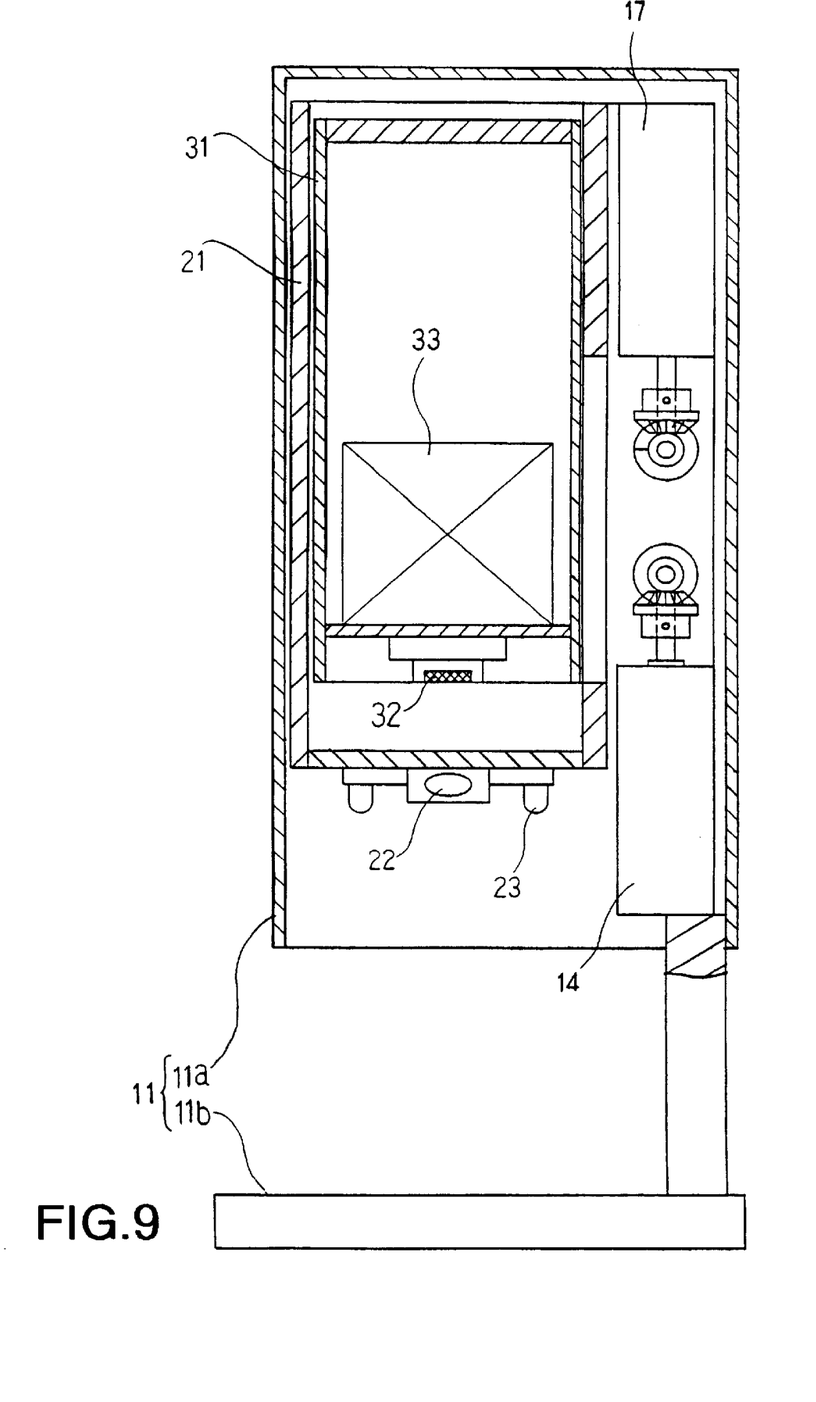

As shown in FIGS. 7 to 9, the video microscope according to the third embodiment of the present invention has, similarly to the first and second embodiments, the observation stand 11 for observing an enlarged (or reduced) image of the object (not shown), the lens body tube 21 having the convex lens 22 that acts as an objective lens arranged along an axially extending imaging optical path, and the video signal converting section tube 31 having the two-dimensional CCD element 32 arranged at a predetermined position on the imaging optical path corresponding to the convex lens 22. Note that each of the observation stand 11, the lens body tube 21 and the video signal converting section tube 31 has a rectangular cross section in this embodiment.

The video signal converting section tube 31 incorporates the assembly 33 such as the drive circuit of the two-dimensional CCD element 32 and the like, and also has the cable connector (not shown) at the other end for inputting signals for driving and controlling the assembly 33 such as the drive circuit and for outputting video signals and the like to be processed by the assembly 33 such as the drive circuit.

The observation stand 11 is comprised of a tube section 11*a* incorporating each mechanism and a support base section 11*b* for supporting the tube section 11*a*. An opening is provided at one end (the lower side end face as viewed in FIG. 7) of the tube section 11*a*. The support base section 11*b* serves also as a stand for mounting the object thereon, and thus the object mounted on the stand faces the convex lens 22 and the CCD element 32 within the tube section 11*a* through the opening.

The lens body tube 21, which is formed into a rectangular tube, is arranged so as to be slidable in the axial direction within the tube section 11*a* of the observation stand 11 in such a manner that three out of the four outer surfaces of the tube 21 are relatively close to the inner wall of the tube section 11*a* and the remaining surface (the back surface) is away from the inner wall. The ringlike shaped illuminating light 23 for illuminating the object is fixed around the distal end of the lens body tube 21. Between the observation stand 11 and the lens body tube 21 as well as on the back surface of the observation stand 11 are provided the objective distance adjusting mechanism 12, the objective distance position detecting sensor 13, the objective distance adjustment drive motor 14 and a bearing section 52. The mechanism 12 positionally adjusts the objective distance of the object mounted on the support base section 11*b* relative to the convex lens 22. The sensor 13 detects the objective distance. The motor 14 drives the mechanism 12 and the sensor 13. The section 52 supports the sliding movement of the lens body tube 21.

Further, the video signal converting section tube 31, which is formed into a rectangular tube, is arranged so as to be slidable in the axial direction within the lens body tube 21 in such a manner that two confronting surfaces out of the four outer surfaces of the tube 31 are relatively close to the lens body tube 21 and the other two surfaces (both of the left and right surfaces as viewed in FIG. 8) are away from the inner wall of the tube 21. Between the observation stand 11 and the video signal converting section tube 31 as well as on the back surface of the observation stand 11 are provided the object imaging distance adjusting mechanism 15 and the object imaging distance adjustment drive motor 17. The mechanism 15 positionally adjusts the object imaging distance of the object relative to the image pickup surface of the two-dimensional CCD element 32. Note that the object imaging distance position detecting sensor 16 and a bearing section 53 are arranged in the space formed between the lens body tube 31 and the video signal converting section tube 21 (the space formed between the other two surfaces of the tube 31 and the lens body tube 21). The sensor 16 detects the object imaging distance. The section 53 supports the sliding movement of the video signal converting section tube 31.

The objective distance adjusting mechanism 12 is constructed as follows. A pinion 55 for meshing with the teeth of a corresponding rack arranged on a rib 54 that is attached to a side surface of the lens body tube 21 is rotated by the driving force of the objective distance adjustment drive motor 14, so that the lens body tube 21 is moved relative to the observation stand 11 in the same direction as the direction of the optical axis, i.e., vertically as viewed in FIG. 7. Note that, unlike the first embodiment, the objective distance adjustment drive motor 14 in this embodiment is arranged longitudinally so that the output shaft thereof 14*a* is oriented in the same direction as the direction of the optical axis. Further, a helical gear 14*b* is provided on the distal end of the output shaft 14*a*, and it is so arranged that a helical gear 14*c* that meshes orthogonally with the helical gear 14*b* rotates integrally with the pinion 55. As a result of this construction, the driving force of the objective distance adjustment drive motor 14 is transmitted to the pinion 55, thereby rotating the pinion 55.

Further, the object imaging distance adjusting mechanism 15 is constructed as follows. The teeth of a rack arranged on a rib 56 that is attached to a side surface of the video signal converting section tube 31 mesh with a pinion 57 in such a manner that the rib 56 is stuck out of a slitlike window 58 formed in the corresponding side surface of the lens body tube 21 and the tube 31 is inserted into the tube 21 so as to be slidable in the axial direction, and the pinion 57 is rotated by the object imaging distance adjustment drive motor 17. As a result of this construction, the video signal converting section tube 31 is moved relative to the observation stand 11 in the same direction as the direction of the optical axis, i.e., vertically as viewed in FIG. 7 while sliding along the lens body tube 21.

Note that the object imaging distance adjustment drive motor 17 in this embodiment is arranged longitudinally so that the output shaft 17*a* thereof projects in the same direction as the direction of the optical axis, and is also put above the objective distance adjustment drive motor 14 in the optical axis direction. Further, the helical gear 17*b* is provided on the distal end of the output shaft 17*a*, and it is so arranged that the helical gear 17*c* that meshes orthogonally with the helical gear 17*b* rotates integrally with the pinion 57. As a result of this construction, the driving force of the object imaging distance adjustment drive motor 17 is transmitted to the pinion 57, thereby rotating the pinion 57.

Note that how the motors 14 and 17 are controlled and how their circuits are specifically designed are totally arbitrary as long as such a motor drive control as to satisfy the expressions (1) to (3) can be effected.

The video microscopes according to the aforementioned embodiments which are constructed as described above are used in a similar way, respectively. That is, the object is located at a predetermined position, and the video magnification setting unit is adjusted to set the magnification to a predetermined value, e.g., to 25×. Then, the magnification is changed to, e.g., 200×, and a fine focus adjustment is thereafter made. Thus, once the fine focus adjustment has been made, whenever the video magnification setting unit is adjusted to set the magnification to desired values, the motors 14 and 17 operate to automatically make such an adjustment that the object is in focus on the image pickup element.

While the aforementioned embodiments are examples of preferred embodiments of the present invention, the invention is not limited to these embodiments, but may be embodied while modified in various ways within such a scope as not to depart from the gist thereof. For example, while the two-dimensional CCD element 32 is used as the image pickup element in each of the embodiments as described above, other types of image pickup elements may also be used.

Further, while the video magnification setting unit 42 that sets a magnification for magnifying the image of an object is provided in the aforementioned embodiments, the video magnification setting unit 42 may be of such a type as to select and input one magnification from a limited number of magnifications using a manual button, or of such a type as to set a finely defined magnification by operating a computer or the like.

Further, it may also be designed so that the magnification can be changed with the object always being in focus on the image pickup element. That is, in the course of changing the magnification, e.g., from a current magnification of 100× to a desired magnification of 200×, the object is always kept in focus on the image pickup element even at any one of intermediate magnifications, such as 101×, 102×, 103× and soon, which is between the current and desired magnifications. More specifically, a reference table is prepared for the video magnification setting unit 42, which is constructed of a microcomputer, a personal computer or the like. The reference table is prepared by tabulating in advance the video magnifications, the objective distance values corresponding to the video magnification and the lens system (the distance values between the object 1 and the convex lens 22) and the object imaging distance values (the distance values between the object 1 and the two-dimensional CCD element 32) by calculating those distances so as to match the respective video magnifications. The lens body tube 21 and the video signal converting section tube 31 are moved respectively based on the reference table. Alternatively, when the objective distance value is set, the object imaging distance value corresponding to the set distance value is derived from the previously indicated expressions, and the lens body tube 21 and the video signal converting section tube 31 may be moved respectively based on such distances. As a result, the object can be kept in focus on the image pickup element at all times even while the magnification is being changed, and thus a person looking into the video microscope can recognize which part of the object is being enlarged (or reduced) even in the course of changing the magnification As described in detail for each of the embodiments, according to the present invention, the objective distance (a) is automatically controlled by the objective distance adjustment drive motor based on the relational expression (2) and the like, and the object imaging distance (L) is automatically controlled by the object imaging distance adjustment drive motor based on the relational expression (3) and the like. These automatic controls are effected by the arithmetic controller, which effects calculation and control in response to a video magnification setting signal from the video magnification setting unit and position detection signals from the objective distance position detecting sensor and the object imaging distance position detecting sensor. The arithmetic controller automatically adjusts and sets the respective motors so that the lens body tube and the video signal converting section tube are moved to such positions as to obtain a predetermined magnification and allow an object to be in focus at the same time. As a result, the image of the object can be easily formed with the touch of a button quickly and automatically, while clearly projected on the two-dimensional CCD element at the desired enlarging (or reducing) magnification. Thus, in order to change the enlarging (or reducing) magnification for a formed image, there is no need to prepare a set of desired lens systems in advance and exchange lens systems every time the magnification is changed as in the conventional example. Further, there is no need for magnification changing operation and fine focus adjustments after magnification changes have been made. Hence, the present invention can provide an excellent advantage that the enlarged (or reduced) image of an object can be observed easily with the touch of a button over an extremely wide range.

What is claimed is:

1. A video microscope comprising:

an observation stand whose position is fixed relative to an object;

a lens body tube having a lens system arranged at one end thereof along an imaging optical path with respect to the object and being inserted into said observation stand so as to be movable in an optical axis direction;

a video signal converting section tube having an image pickup element arranged at a predetermined position corresponding to the lens system, being arranged so as to be movable in the optical axis direction relative to said observation stand, and being arranged so as to be movable relative to said lens body tube;

an objective distance adjustment drive motor for moving said lens body tube in the optical axis direction by driving an objective distance adjusting mechanism and an objective distance position detecting sensor which are arranged between said observation stand and said lens body tube, the objective distance adjusting mechanism serving to adjust an objective distance between the object and a principal point on the object side of the lens system, the objective distance position detecting sensor serving to detect the objective distance;

an object imaging distance adjustment drive motor for moving said video signal converting section tube in the optical axis direction by driving an object imaging distance adjusting mechanism and an object imaging distance position detecting sensor which are provided between said observation stand and said video signal converting section tube, the object imaging distance adjusting mechanism serving to adjust an object imaging distance between the object and the image pickup surface of the image pickup element, the object imaging distance position detecting sensor serving to detect the object imaging distance; and an arithmetic controller for setting the objective distance and the object imaging distance to predetermined positions by driving said objective distance adjustment drive motor and said object imaging distance adjustment drive motor, wherein in response to a position detection signal from said objective distance position detecting sensor and a position detection signal from the object imaging distance position detecting sensor, said arithmetic controller can automatically adjust and set the positions of said lens body tube and said video signal converting section tube by respectively driving said objective distance adjustment drive motor and said object imaging distance adjustment drive motor in such a manner that the object can be in focus on the image pickup element at a set magnification.

2. A video microscope as claimed in claim 1, wherein the image pickup element is constructed of a two-dimensional CCD element and an illuminating light for illuminating the object is provided at the distal end of one of said lens body tube and said observation stand.

3. A video microscope as claimed in claim 1, wherein a video magnification setting unit for setting a magnification for magnifying an image obtained by the image pickup element is provided, and both of said motors are driven so that the objective distance and the object imaging distance are adjusted to such predetermined positions as to correspond to a video magnification based on a video magnification setting signal from said video magnification setting unit.

4. A video microscope as claimed in claim 1, wherein both of said motors are longitudinally arranged in such a manner that output shafts thereof project in the optical axis direction.

5. A video microscope as claimed in claim 1, wherein the set magnification can be changed to a desired magnification with the object being in focus on the image pickup element by moving said lens body tube and said video signal converting section tube in such a manner that an objective distance value and an object imaging distance value always correspond to any magnifications obtained in the course of changing the set magnification to the desired magnification.

6. A video microscope as claimed in claim 1, wherein each of said observation stand, said lens body tube and said video signal converting section tube is formed into a tube having a rectangular cross section, and said objective distance adjustment drive motor and said object imaging distance adjustment drive motor are arranged both between said observation stand and said lens body tube and on one side surface or between two side surfaces.

7. A video microscope as claimed in claim 1, wherein both of said motors are arranged on the back surface of said observation stand.

8. A video microscope as claimed in claim 1, wherein both of said motor are vertically overlapped one upon another in the optical axis direction.

9. A video microscope comprising:
an observation stand of which opening at one end confronts an object;
a lens body tube having a lens system arranged at one end thereof along an imaging optical path with respect to the object and being slidably inserted into said observation stand on opening side at the other end of said lens body tube;
an illuminating light fixedly arranged around the distal end of said lens body tube confronting the object;
a video signal converting section tube having two dimensional CCD element, a driving circuit thereof, and the like arranged at the predetermined position corresponding to the lens system and being slidably inserted to said lens body tube on the opening side at the other end thereof;
an objective distance adjustment drive motor for driving an objective distance adjusting mechanism and an objective distance position detecting sensor which are arranged between said observation stand and said lens body tube, the objective distance adjusting mechanism serving to adjust an objective distance between the object and a principal point on the object side of the lens system, the objective distance position detecting sensor serving to detect the objective distance;
an object imaging distance adjustment drive motor driving an object imaging distance adjusting mechanism and an object imaging distance position detecting sensor which are provided between said observation stand and said video signal converting section tube, the object imaging distance adjusting mechanism serving to adjust an object imaging distance between the object and the image pickup surface of the two dimensional CCD element, the object imaging distance position detecting sensor serving to detect the object imaging distance; and
an arithmetic controller for setting the objective distance and the object imaging distance to predetermined positions by respectively driving a video magnification setting unit, said objective distance adjustment drive motor, and said object imaging distance adjustment drive motor independently, the video magnification setting unit arranged outside (or inside) of said observation stand for setting a magnification for an image;
wherein in response to a video magnification setting signal from said video magnification setting unit, a position detection signal from said objective distance position detecting sensor, and a position detection signal from said object imaging distance position detection sensor, output of said arithmetic controller can automatically adjust and set the positions of said lens body tube and said video signal converting section tube by simultaneously driving each of the objective distance adjustment drive motor and the object imaging distance adjustment drive motor so that the objective distance and the object imaging distance are in predetermined positions corresponding to a video magnification of the video magnification setting signal from said video magnification setting unit based on predetermined relational expressions.

10. A video microscope as claimed in claim 9, wherein both of said motors are longitudinally arranged in such a manner that output shafts thereof project in an optical axis direction.

11. A video microscope as claimed in claim 9, wherein the set magnification can be changed to a desired magnification with the object being in focus on the image pickup element by moving said lens body tube and said video signal converting section tube in such a manner that an objective distance value and an object imaging distance value always correspond to any magnifications obtained in the course of changing the set magnification to the desired magnification.

12. A video microscope as claimed in claim 9, wherein each of said observation stand, said lens body tube and said video signal converting section tube is formed into a tube having a rectangular cross section, and said objective distance adjustment drive motor and said object imaging distance adjustment drive motor are arranged both between said observation stand and said lens body tube and on one side surface or between two side surfaces.

13. A video microscope as claimed in claim 9, wherein both of said motors are arranged on the back surface of said observation stand.

14. A video microscope as claimed in claim 9, wherein both of said motors are vertically overlapped one upon another in the optical axis direction.

* * * * *